Nov. 19, 1935.  G. E. SWARTZ  2,021,336
CLAMPING DEVICE
Filed Nov. 7, 1932  2 Sheets-Sheet 1

INVENTOR
G. E. Swartz
BY C. F. Heinkel
ATTORNEY

Nov. 19, 1935.  G. E. SWARTZ  2,021,336
CLAMPING DEVICE
Filed Nov. 7, 1932   2 Sheets-Sheet 2

INVENTOR
G. E. Swartz
BY
C. F. Heinkel
ATTORNEY

Patented Nov. 19, 1935

2,021,336

UNITED STATES PATENT OFFICE 2,021,336

CLAMPING DEVICE

Guy E. Swartz, Detroit, Mich.

Application November 7, 1932, Serial No. 641,600

16 Claims. (Cl. 81—17)

The present invention relates to improvements in clamping and releasing objects or work.

The present invention has for its object to provide a simple and efficient object clamping device; to provide such a device with a plurality of object contacting members to better clamp an object; to provide such a device with a compensating means for the object contacting members so that the contacts thereof on the object will be even or equal; to provide such a device with a locking mechanism to retain the object contacting members against unclamping or self reversing movement; to provide such a device with means for releasing the locking thereof by an unclamping movement of the operating mechanism thereof; to provide such a device with means to retain the compensating means for the clamping members effective while the clamping means is locked; to provide such a device with co-operating compensating and locking means connected with one operating shaft; to provide such a device with means whereby the clamping mechanism is operated through the locking mechanism; to provide such a device with means whereby the locking mechanism must be operated to operate the clamping mechanism and the locking is effected after clamping; to provide such a device with means whereby the clamping mechanism is automatically held in any position thereof when the operating mechanism stops operating; and to provide such a device with means whereby clamping and locking and releasing can be attained in either direction without change in the device.

Other objects will be pointed out during the description of the device shown in the accompanying drawings or will become obvious or apparent or will suggest themselves upon an inspection of this specification and the accompanying drawings.

I attain my object by the mechanism illustratively shown in the accompanying drawings in which.

Similar reference characters refer to similar parts throughout the views.

Figure 1:
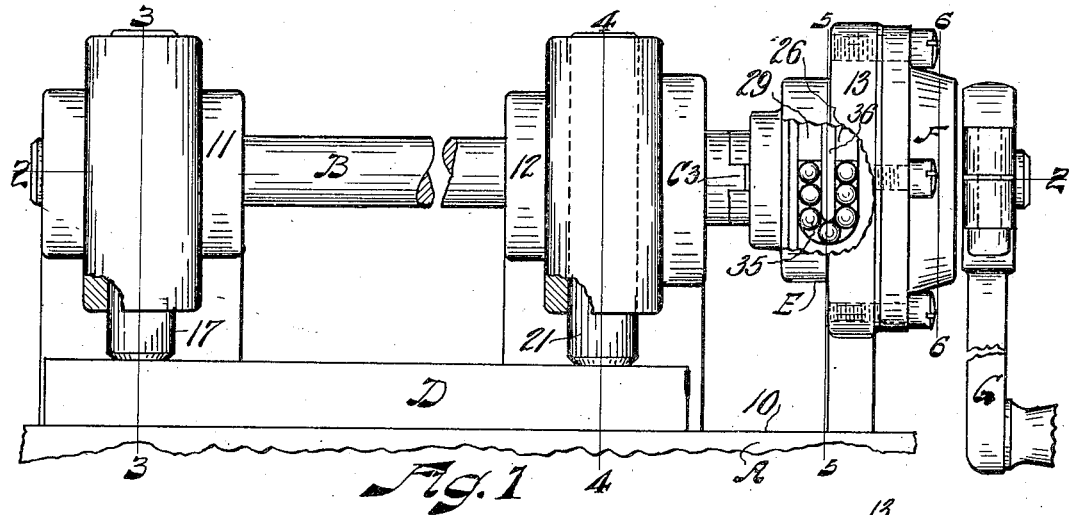
Fig. 1 is a side view of a part of an object clamping device embodying my invention and showing two clamping members and a means for locking against self reversing of the device. Parts are shown in section for better illustration.
Figure 2:
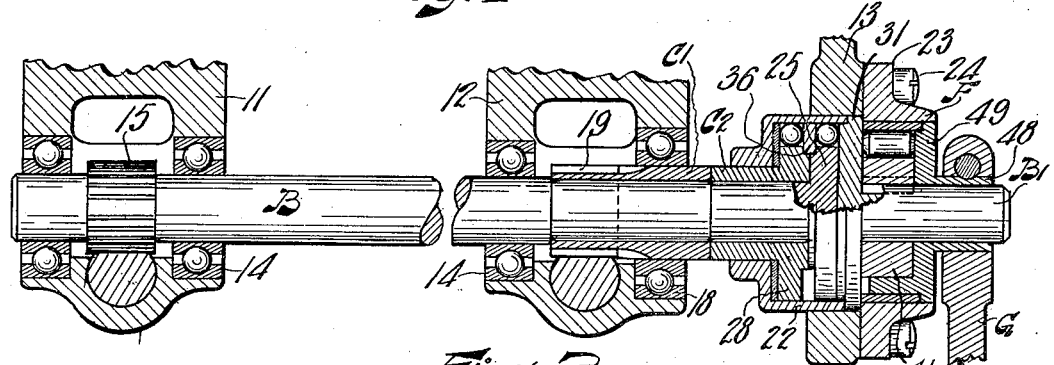
Fig. 2 is a longitudinal section taken on the line 2—2 of Fig. 1.
Figures 3, 4:
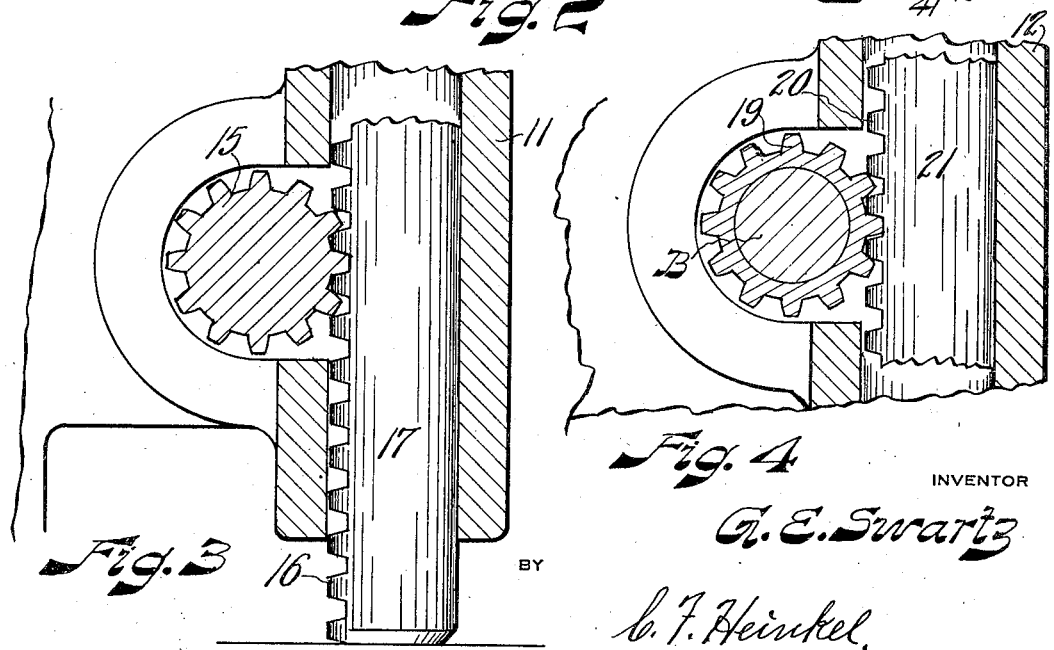
Fig. 3 is a transverse section on a larger scale taken on the line 3—3 of Fig. 1 showing an operative relation between the shaft and one of the clamping members.
Fig. 4 is a transverse section on a larger scale taken on the line 4—4 of Fig. 1 showing an operative relation between the shaft and the sleeve and the other one of the clamping members.
Figure 5:
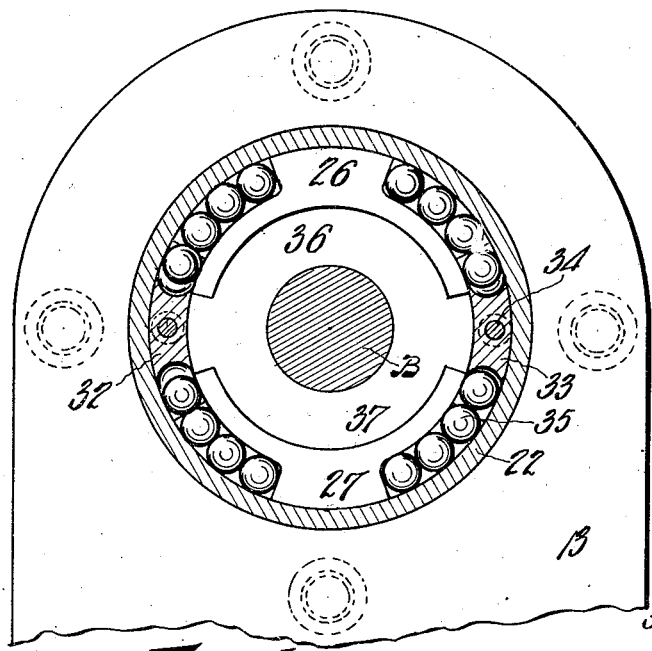
Fig. 5 is a transverse section on a larger scale taken on the line 5—5 of Fig. 1 showing relations of members of the compensating means.

The base A may be of any form and has the face 10 to receive objects to be clamped thereto and also has the bearing bosses 11 and 12 and the flange 13 for purposes appearing below either integral therewith or secured thereto in the form of brackets.

The shaft B is journaled in the bearing bosses 11 and 12 and in the sleeve C in this instance in the ball bearings 14 for anti-friction purposes although other bearings can be used.

The pinion 15 is provided near the outer end of the shaft and rotates therewith and meshes into the teeth 16 on the clamping member 17 which is longitudinally slidably mounted in the bearing boss 11.

The sleeve C is composed of the parts C1 and C2 connected by the clutch element C3 for convenience in manufacturing and is journaled on the shaft intermediate the ends thereof and also in the bearing boss 12 by the ball bearing 18 and has the pinion 19 rotating therewith and meshing into the teeth 20 on the clamping member 21 which is longitudinally slidably mounted in the bearing boss 12. The pitch and number of the teeth on the pinion 19 is the same as the pitch and number of teeth on the pinion 15; the object thereof being to longitudinally move both of the clamping members uniformly when the sleeve and the shaft rotate uniformly.

The end of the clamping members 17 and 21 contact the work piece or object D and exert their pressure longitudinally of the clamping members as is further explained below.

The cup shaped casing 22 of the compensating element E is journaled in the boss or bracket 13 and the cup shaped casing of the locking element F has the radial flange 23 unrotatably secured to a side of the boss or bracket 13 by means of the screws 24.

The radial flange 25 on the inner end of the shaft B and rotatable therewith has the two diametrically opposite radially outwardly extending noses or parts 26 and 27 the outer circumferential surface of which may be journaled in the casing 22.

The radial flange 28 on the end of the sleeve C opposite the pinion 19 thereof and rotatable with the sleeve, has the two diametrically opposite radially outwardly extending noses or parts 29 and 30 the outer circumferential surface of which may be journaled in the casing 22.

The sub-shaft B1 is in axial alinement with the shaft B and has the radial flange 31 rotatable therewith and is centralized in the open end of the cup 22 as shown. The shafts B and B1 may conveniently be called a transversely divided shaft for better understanding of the invention and the below described features and operations and functions thereof.

The prongs 32 and 33 project from the flange 31 with the axes thereof parallel with the axis of the shaft B and may be journaled in the casing 22. The prongs 32 and 33 extend to the bottom of the cup shaped casing and the rivets 34 pass through the flange 31 and the prongs 32 and 33 and the bottom of the casing and thereby holds the shaft B1 rotatably with the casing and closes the open end of the casing.

The sides of the prongs 32 and 33 are curved to form or define a part of the path for the movable members 35 described below.

The spacers 36 and 37 extend circularly between the respective prongs 32 and 33 and substantially along the middle thereof.

Figure 7:
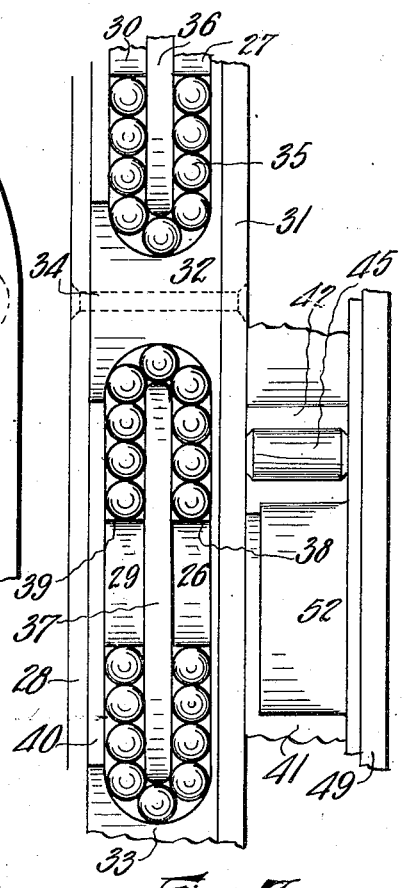
Fig. 7 is a fragmental side view showing a development of the mounting of the compensating members and the locking member adjacent thereto.

The movable compensating members, herein represented by the balls 35, are individually and collectively movable and are formed in four rows, each a duplicate of the other. One end of one row abuts endwise on the face 38 of the nose 26 and the other end of the same row abuts the face 39 of the nose 29. The side of the flange 31 and the side of the washer 40 and the curved side of the prong 32, aided by the spacer 37, forms or defines a channel or path for the members 35 to travel in. The other three rows of balls are mounted in the same manner just described and the ends thereof abut the corresponding noses and the path of the balls is defined as described with the adjacent rounded part of the next row rounded oppositely as seen in Fig. 7 so that the device can operate in opposite directions.

The disk 41 is located within the casing F, is keyed onto the shaft part B1, adjacent to the flange 31, and has the three flat faces 42, 43, and 44 forming a plane or surface inclined to the inner wall surface of the bore of the casing F. The three rollers or locking members 45, 46, and 47 are loosely mounted between the corresponding flat faces and the bore of the casing. The sleeve 48 is journaled on the shaft part B1 and has the radial flange 49 forming the bottom of the cup shaped casing F. The prongs 50, 51, and 52 project from the inside of the flange 49 and extend into the casing F between the locking rollers. The prongs may be journaled in the casing F and on the disk 41.

The operating handle G is clamped onto the sleeve 48 to rotate the same and to be adjustable thereon to relate the same circularly to the device for convenient operating relation thereof to the device.

Figure 6:
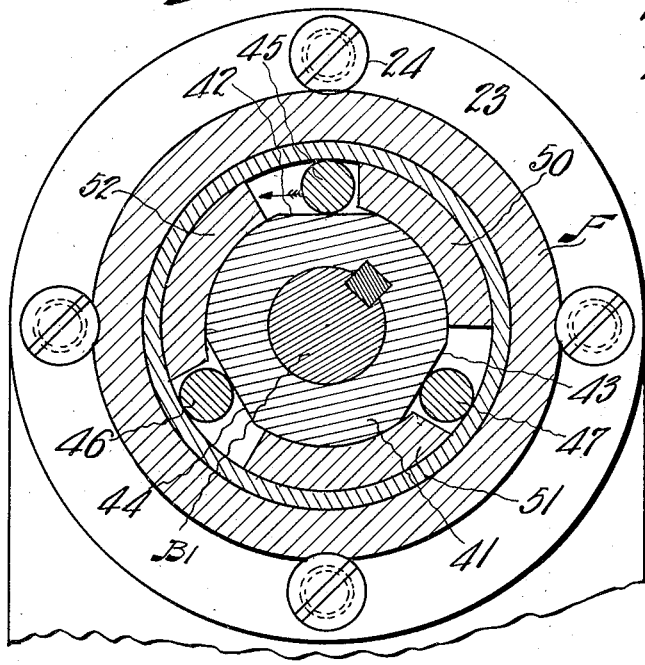
Fig. 6 is a transverse section on a larger scale taken on the line 6—6 of Fig. 1 showing relations of members of the locking mechanism.

Upon operation of the device by means of rotating or circularly moving the operating handle G in the direction of the arrow shown in Fig. 6, the sleeve 48 is rotated. Rotation of the sleeve 48 moves the prongs 50, 51, and 52 circularly and the prongs engage the locking rollers and move the same into the less deep parts of the recesses formed by the flat faces 42, 43, and 44 and the inner wall of the bore of the casing until the locking rollers contact these faces and this inner wall. When the locking rollers so contact or not and there is no load on the device the locking rollers do not lock but the disk 41 rotates with the operating handle and rotates the shaft part B1 and moves the clamping means for contact on the object through the compensating means. When the members of the clamping means encounter a load, as when an object is contacted thereby, the clamping members stop moving temporarily but further movement of the handle in the same direction moves the sleeve and prongs and the locking rollers further into the less deep part of the recess and thereby eventually wedges the same between said disk and the casing and locks the disk and the shaft against rotation in the casing F.

A rotative movement of the operating handle reversely of the arrow contacts the prongs on the opposite side of the locking rollers and thereby first moves the locking members out of their wedging or locking position and then moves them into contact with the disk and the casing F on the opposite side and rotates the shaft in an opposite direction for unclamping of the object.

Three locking rollers are shown but any other number above two may be used.

When, from any cause, the operating handle is moved accidentally so that the locking rollers could release themselves, there is always at least one of the three locking rollers which can drop into the less deep part of the recess by gravity and thereby also prevents the shaft from self reverse movement thereof either when the device is clamping or when it is not clamping so that the clamping members will be held in an unclamping position irrespective of where that position might be within the capacity of the device.

The parts of the locking means and of the compensating means are circularly similar so that the device can operate either right handed or left handed.

While the disk 41 is rotating the shaft B1, the prongs 32 and 33 move therewith and engage the round part of the rows of rollers and abut one end of each row on the nose 26 and the other end on the nose 27 and thereby rotate the shaft part B in unison with the shaft part B1 and with the sleeve C and thereby move the clamping members 17 and 21 longitudinally for clamping of objects and unclamping thereof through the gear relation between the shaft and one of the clamping members and between the sleeve and the other clamping member.

When the contact of one of the clamping members, or the one clamping member when only one is used, becomes loose while the device is locked, the pressure of that clamping member on the object is less than that of the other clamping member. This condition is at once and automatically neutralized or equalized by the nose connected with the higher pressure clamping member moving the compensating members in their path and toward the nose of the lesser pressure clamping member to move the same circularly and take up whatever inequality there may be between the force of this latter clamping member and the object until the contact force or pressure of both clamping members on the object is equal.

When only one clamping member is to be used, the change can be made by cutting off or omitting either one of the clamping members and arranging the remaining members accordingly.

While I have shown and described a specific compensating means and a specific locking means on one shaft and in one structure, it is to be understood that the compensating means may be used independently of the locking means in various structures and that the locking means can be similarly used independently of the compensating means.

I am aware that my invention can be applied in manners other than the one shown and described and that changes and modifications can be made in the structure and arrangement of parts from the structure shown and described within the spirit and intent of the invention and of the appended claims. Therefore, without limiting myself to the precise application of my invention as shown and described nor to the precise structure and arrangement of parts as shown and described,

I claim:

1. An object clamping and locking device having individually operated clamping members, an operating means for said clamping members, a pressure compensating means between said clamping members to equalize the clamping force of said clamping members on the object and to retain the clamping force equal therein while the object is clamped, and a locking mechanism on the device to retain said clamping members against self reversing when said operating means is not being operated and operating independently of said compensating means.

2. An object clamping and locking device having individually operated clamping members, an operating means for said clamping members, a mechanical pressure compensating means for said clamping members to equalize the clamping force of said clamping members on the object and to retain the clamping force equal therein while the object is clamped, a locking mechanism on the device to retain said clamping members against self reversing when said operating means is not being operated and operating independently of said compensating means, and means to automatically release said locking mechanism upon an unclamping movement of said operating means.

3. An object clamping device comprising, relatively movable object clamping members, a shaft operatively connected with one of said clamping members, a sleeve on said shaft and operatively connected with another one of said clamping members, a self operating pressure compensating means between said shaft and said sleeve to move said clamping members relatively to equalize the contact of said clamping members on the object, and a releasable locking mechanism to retain said clamping members against self reversing but to retain said compensating means self operative to equalize the contact of said clamping members on the object.

4. An object clamping device comprising, a clamping mechanism and a locking mechanism and a mechanical pressure compensating mechanism co-operating to clamp and to retain the object clamped evenly comprising laterally spaced, co-operatively related clamping members, a disk in operative connection with said clamping members through said compensating mechanism, locking members engaging said disk to rotate the same for operation of said clamping mechanism and for releasably locking the same against self reversing thereof upon completion of a clamping operation thereby, and an operating means to move said locking members and said compensating mechanism.

5. An object clamping device having laterally spaced, co-operatively related clamping members, a mechanical clamping compensating means for said clamping members, a locking mechanism comprising a casing, a disk in said casing to operate said clamping members through said compensating means, a locking member movable between said casing and said disk, and an operating mechanism for the device to first move said locking member to operate said compensating means and said clamping members and to then wedge the same between said disk and said casing to lock the clamping members against self reversing but leave said compensating means free to equalize clamping force between said clamping members and, upon reverse movement of said operating mechanism, to release said wedging for reverse movement of said clamping members.

6. An object clamping device having laterally spaced, co-operatively related clamping members, a mechanical pressure compensating means for said clamping members, an operating mechanism, and a locking mechanism for said operating mechanism comprising a casing, a disk in said casing to operate said clamping members through said compensating means, a surface on said disk forming with the wall of said casing a recess deepest at the substantial middle thereof and tapering to less depth at each side of the middle, a movable locking member in said recess, and a member of said operating mechanism engaging said locking member to wedge the same into a less deep part of said recess after a clamping operation to releasably lock said clamping mechanism against self reversing but leave said compensating means free to equalize clamping force between said clamping members.

7. An object clamping device having laterally spaced, co-operatively related clamping members, a mechanical pressure compensating means for said clamping members, an operating mechanism and a locking mechanism for said operating mechanism comprising a casing, a disk in said casing to operate said clamping members through said compensating means, an odd number of surfaces on said disk each forming with the wall of said casing a recess deepest at the substantial middle thereof and decreasing in depth at each side of the middle, a movable locking member in each one of said recesses, and a member of said operating mechanism engaging said compensating means to move said clamping members and engaging said locking members to wedge the same into a less deep part of the corresponding recesses to releasably lock said clamping mechanism against self reversing after a clamping operation but leave said compensating means free to equalize the clamping force between said clamping members.

8. An object clamping device comprising co-operatively related axially movable object contacting members to releasably clamp an object, a mechanical pressure compensating mechanism to move said contacting members relatively to equalize the contact pressure of said contacting members on said object, and an operating means engaging said compensating mechanism to move both of said contacting members for equal pressure contact on the object.

9. An object clamping device comprising relatively movable object contacting members to releasably clamp an object, a mechanical pressure compensating mechanism to move said contacting members to equalize the contact pressure of said contacting members on the object, a locking mechanism to prevent self reversing of said contacting members, and an operating means having a part to engage a part of said locking mechanism for locking said operating means against self reversing after clamping and to release said locking for unclamping and also having a part to engage a part of said compensating means to effect movement of said contacting members and to equalize the clamping force between said contacting members.

10. A compensating means for relatively movable members comprising an operating means, a U shaped groove in said operating means, a row of balls movable in said groove, and the ends of said row in contact respectively on parts of said relatively movable members.

11. An object clamping device comprising, relatively movable object clamping members each having an individual moving means, a driving means for said clamping members to effect clamping of the object and including a compensating means having a part thereof in contact on the individual moving means of one of said clamping members and another part thereof in contact on the individual moving means of another one of said clamping members to move said clamping members relatively to effect equal clamping force of each clamping member on the object and also including a releasable mechanism to lock said driving means against self reversing.

12. In a clamping device, object clamping and releasing members, a driving means for said members, a clamping compensating means for said members in and operated by said driving means, and a releasable locking means for said driving means comprising, a casing for said locking means, a disk in said casing to be operated by said driving means, surfaces on said disk each forming, with a portion of the inner wall of said casing, a recess decreasing in depth toward each end thereof, a movable locking member in each of said recesses, at least one of said movable members adapted to drop into the less deep part of its recess by gravity when said operating means is not operating to lock said clamping means against reversely operating said operating means.

13. In an object clamping device, object clamping and releasing members, a driving means for said members, a clamping compensating means for said members in and operated by said driving means, a releasable locking means for said driving means comprising a casing for said locking means, a disk in said casing to be operated by said driving means, surfaces on said disk each forming, with a portion of the wall of said casing, a recess decreasing in depth toward each end thereof, a movable locking member in each of said recesses, a prong for each of said locking members in said driving means and engaging the corresponding locking members to move the same into the less deep parts of said recesses for locking said clamping members against reversely operating said driving means and out of the less deep parts of said recess for releasing of the locking, and said driving means also including a pressure compensating means for said clamping members and a prong to operate the same, said clamping compensating means comprising relatively movable parts, a U shaped row of balls, one end of said row of balls in contact on one of said movable parts and the other end in contact on another one of said movable parts, and the secondly mentioned prong in contact on the rounded portion of said row of balls.

14. In an object clamping device, a clamping means having clamping members, an operating means for said device, locking means to prevent self reversal of said clamping means and a compensating means to equalize clamping force of said clamping members, a part on said operating means to operate said locking means, and a part on said operating means to operate said compensating means; said compensating means comprising a U shaped groove in the secondly mentioned part of said operating means, a row of balls movable in said groove, and the ends of said row in contact with relatively movable parts of said clamping means.

15. An object clamping device having relatively movable clamping members, a shaft in operative connection with one of said members, a flange on said shaft, a sleeve journaled on said shaft and in operative connection with another one of said members, a flange on said sleeve, a compensating means between said flanges to relatively and compensatingly move the same and the respective movable members connected therewith according to requirement of said movable members and including a U shaped row of individually movable members, one end of said row abutting one of said flanges, and the other end of said row abutting the other one of said flanges.

16. An object clamping device having object clamping members movable conjointly and relatively, a shaft in operative connection with one of said movable members and having a flange, a sleeve on said shaft and in operative connection with another one of said movable members and having a flange, a self acting compensating means comprising a U shaped groove having the straight parts thereof located in said flanges, a row of rotatable, positionally movable balls in said groove, one end of said row abutting one of said flanges, the other end of said row abutting the other one of said flanges, an operating means for said shaft, a releasable locking mechanism for said shaft intermediate said compensating means and said operating means to retain said movable members against self reversing and to retain said compensating means in self acting condition, and releasing means for said locking mechanism operated by reversing movement of said operating means.

GUY E. SWARTZ.